(12) United States Patent
Okino

(10) Patent No.: US 10,052,555 B2
(45) Date of Patent: Aug. 21, 2018

(54) INFORMATION PROCESSING DEVICE, DATA STRUCTURE OF GAME DATA, AND RECORDING MEDIUM

(71) Applicant: Sony Computer Entertainment Inc., Tokyo (JP)

(72) Inventor: Naoto Okino, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 720 days.

(21) Appl. No.: 14/510,438

(22) Filed: Oct. 9, 2014

(65) Prior Publication Data
US 2015/0126283 A1   May 7, 2015

(30) Foreign Application Priority Data

Nov. 1, 2013 (JP) .................................. 2013-228809
Nov. 1, 2013 (JP) .................................. 2013-228810

(51) Int. Cl.
*A63F 13/71* (2014.01)
*A63F 13/35* (2014.01)
(Continued)

(52) U.S. Cl.
CPC .............. *A63F 13/35* (2014.09); *A63F 13/60* (2014.09); *A63F 13/70* (2014.09); *A63F 13/71* (2014.09);
(Continued)

(58) Field of Classification Search
CPC .......... A63F 13/35; A63F 13/71; A63F 13/73; A63F 13/77; A63F 2300/207;
(Continued)

(56) References Cited

U.S. PATENT DOCUMENTS 6,535,867 B1 * 3/2003 Waters .............. G06F 17/30067
7,849,491 B2   12/2010 Perlman
(Continued)

FOREIGN PATENT DOCUMENTS

CN       1352507 A      6/2002
CN     102929654 A      2/2013
(Continued)

OTHER PUBLICATIONS

European Search Report for corresponding EP Patent Application No. 14003112.1, pp. 1-9, dated Jun. 5, 2015.
(Continued)

*Primary Examiner* — Damon Pierce
(74) *Attorney, Agent, or Firm* — Matthew B. Dernier, Esq.

(57) ABSTRACT

Disclosed herein is an information processing device for accessing a file included in game data, the game data having a correspondence file associating a hash value of full path information of the file with information for identifying a recording location of the file. The information processing device includes: a receiving section receiving a readout request including the full path information of the file from a game; a deriving section deriving the hash value of the full path information; an obtaining section referring to the correspondence file, and obtaining the information for identifying the recording location of the file using the hash value; and a file access section accessing the file on a basis of the obtained information.

5 Claims, 16 Drawing Sheets

(51) Int. Cl.
*A63F 13/70* (2014.01)
*A63F 13/60* (2014.01)

(52) U.S. Cl.
CPC ... *A63F 2300/207* (2013.01); *A63F 2300/209* (2013.01); *A63F 2300/5526* (2013.01)

(58) Field of Classification Search
CPC .......... A63F 2300/209; A63F 2300/552; A63F 2300/5526; G06F 3/0643; G06F 17/30067
See application file for complete search history.

(56) References Cited

U.S. PATENT DOCUMENTS

| 8,113,955 | B1 | 2/2012 | Ho |
| 2003/0140051 | A1* | 7/2003 | Fujiwara ............ H04L 67/1097 |
| 2008/0182659 | A1 | 7/2008 | Sebella |
| 2008/0215834 | A1 | 9/2008 | Dumitru |
| 2011/0092291 | A1 | 4/2011 | Perlman |
| 2011/0252371 | A1 | 10/2011 | Nguyen |
| 2012/0088584 | A1 | 4/2012 | Mamatani |
| 2012/0100910 | A1 | 4/2012 | Eichorn |
| 2013/0268499 | A1 | 10/2013 | Kirihata |
| 2014/0047244 | A1 | 2/2014 | Buswell |
| 2014/0067988 | A1 | 3/2014 | Noronha |
| 2015/0120674 | A1 | 4/2015 | Lavoie |
| 2015/0343306 | A1 | 12/2015 | Bentdahl |

FOREIGN PATENT DOCUMENTS

| EP | 1239379 A2 | 9/2002 |
| WO | 0215998 A2 | 2/2002 |
| WO | 2013158066 A1 | 10/2013 |

OTHER PUBLICATIONS

Ronald Fagin, Jurg Nievergelt, Nicholas Pippenger, H. Raymond Strong: "Extendible Hashing—A Fast AccessMethod for Dynamic Files", IBM research laboratory, pp. 1-30, URL:http://www.diku.dk/hjemmesider;ansatte /henglein/papers/fagin1979.pdf, Sep. 1, 1979.

R.J. Enbody, H.C. Du: "Dynamic Hashing Schemes", University of Minnesota, pp. 1-29, URL:http://www.ic.unicamp.br/-celio/mc326/hashing/dynamic-hashing-enbody.pdf, Jun. 2, 1998.

Office Action for related U.S. Appl. No. 14/510,447, 12 pages, dated Oct. 11, 2017.

Office Action for corresponding CN Application No. 201410541656.4, 13 pages, dated Jul. 31, 2017.

Office Action for corresponding U.S. Appl. No. 14/510,447, 13 pages, dated Jul. 2, 2018.

* cited by examiner

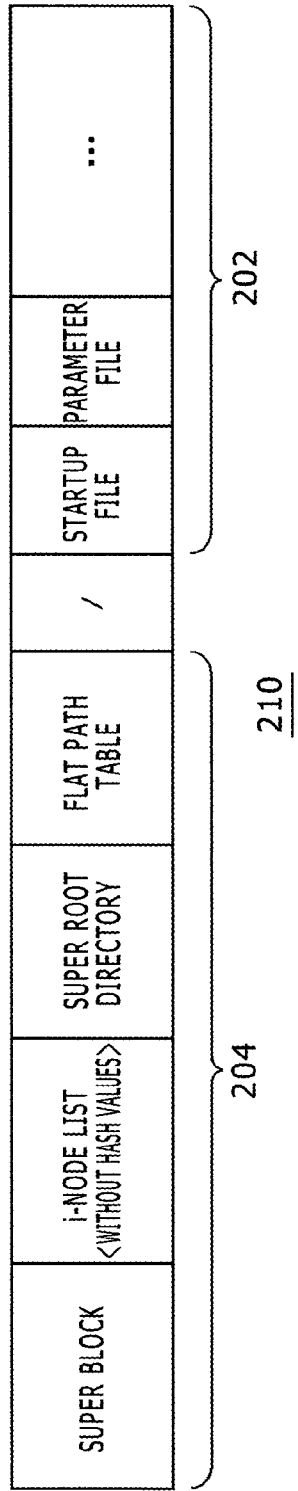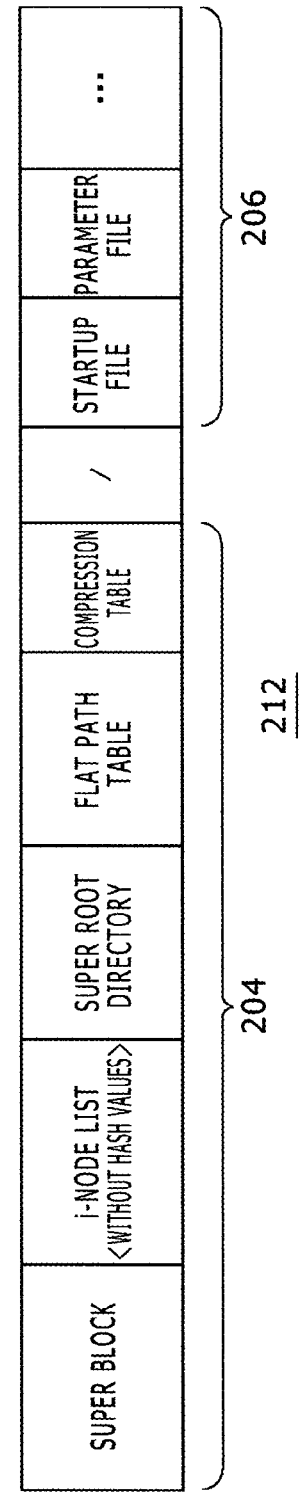

FIG.12A

| HASH VALUE OF FULL PATH INFORMATION | i-NODE NUMBER/OFFSET |
|---|---|
| 0010F32A | FLAG 0 ··· |
| 012B341C | FLAG 1 (OFFSET) |
| ⋮ | ⋮ |
| E39F4210 | FLAG 0 ··· |

| FILE NAME | i-NODE NUMBER |
|---|---|
| abcdef | ··· |
| ahijklm | ··· |
| ⋮ | ⋮ |
| zkmnop | ··· |

222

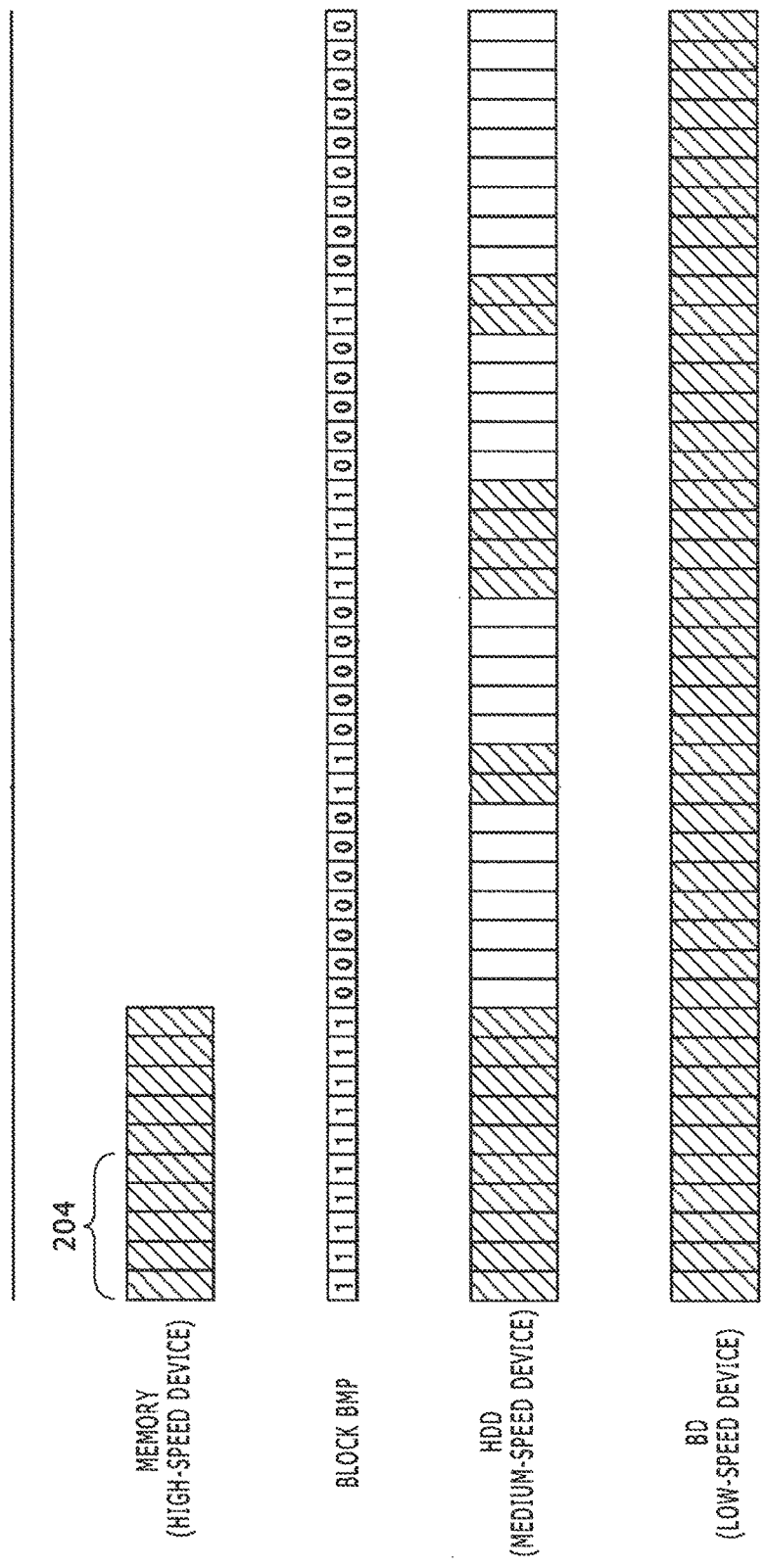

INFORMATION PROCESSING DEVICE, DATA STRUCTURE OF GAME DATA, AND RECORDING MEDIUM

BACKGROUND

The present disclosure relates to a data structure of game data, an information processing device for processing game data having the data structure, and a recording medium.

In related art, game data (game software) including a game program has been distributed and sold in the form of a ROM (read-only memory) medium such as an optical disk, a magneto-optical disk, a Blu-ray Disk, or the like. Recently, due to increases in speed of data communication on the Internet, it has become possible for servers to distribute an image file of game data via the Internet.

SUMMARY

The game software includes a resource file group for executing a game such as a startup file, a game program, and the like and a file group used by an OS (operating system) of a game device. As the hardware specifications of the game device have improved dramatically, the number of files included in the game software tends to be increased, and data size tends to be increased. The game software includes a plurality of game files and the metadata of each file. During execution of the game program, the metadata is desirably read out into a memory in advance for a purpose of identifying a sector storing a file, for example, and used for file access processing. Because of a limited size of the memory, there is a desire for development of a data structure in which the data size of the metadata is minimized.

In addition, expanding the metadata in the memory contributes to an increased speed of file access. However, data is read out from storage units storing game files at various speeds. It is known that in general, data is read out from a media drive in which a ROM medium is loaded at a slow speed, and data is read out from a DRAM (dynamic random access memory) at a fast speed. There is accordingly a desire for development of a technology for making efficient file access in a case where game files are stored in a plurality of storage units.

An information processing device according to a mode of the present disclosure is an information processing device for accessing a file included in game data, the game data having a correspondence file associating a hash value of full path information of the file with information for identifying a recording location of the file, the information processing device including: a receiving section receiving a readout request including the full path information of the file from a game; a deriving section deriving the hash value of the full path information; an obtaining section referring to the correspondence file, and obtaining the information for identifying the recording location of the file using the hash value; and a file access section accessing the file on a basis of the obtained information.

Another mode of the present disclosure is a data structure of game data. The data structure of the game data is a data structure of game data including a program file executed by a computer, the game data including a plurality of files that are each assigned one or a plurality of blocks and including metadata of each file, the data structure including: a correspondence file associating hash values of full path information of the files with information for identifying recording locations of the files; and a collision file associating file names with information for identifying recording locations of files, for full path information whose hash values collide with each other.

Still another mode of the present disclosure is a computer readable recording medium on which a program for a computer is recorded. The program includes: receiving a readout request including full path information of a file from a game; deriving a hash value of the full path information; referring to a correspondence file associating the hash value of the full path information of the file with information for identifying a recording location of the file, and obtaining the information for identifying the recording location of the file using the hash value; and accessing the file on a basis of the obtained information.

It is to be noted that arbitrary combinations of the above-described constituent elements as well as methods, devices, systems, recording media, computer programs, and the like into which expressions of the present disclosure are converted are also effective as modes of the present disclosure.

According to the information processing technology of the present disclosure, an environment in which a user can play a game comfortably can be realized.

BRIEF DESCRIPTION OF THE DRAWINGS

FIG. 10A is a diagram showing an example of a completely plain text image file of game data, and FIG. 10B is a diagram showing an example of a compressed image file;

FIG. 12A is a diagram showing an example of a flat path table, and FIG. 12B is a diagram showing an example of a collision file;

FIG. 17 is a diagram schematically showing states of storage areas of storage units.

DETAILED DESCRIPTION OF THE PREFERRED EMBODIMENT

Figure 1:
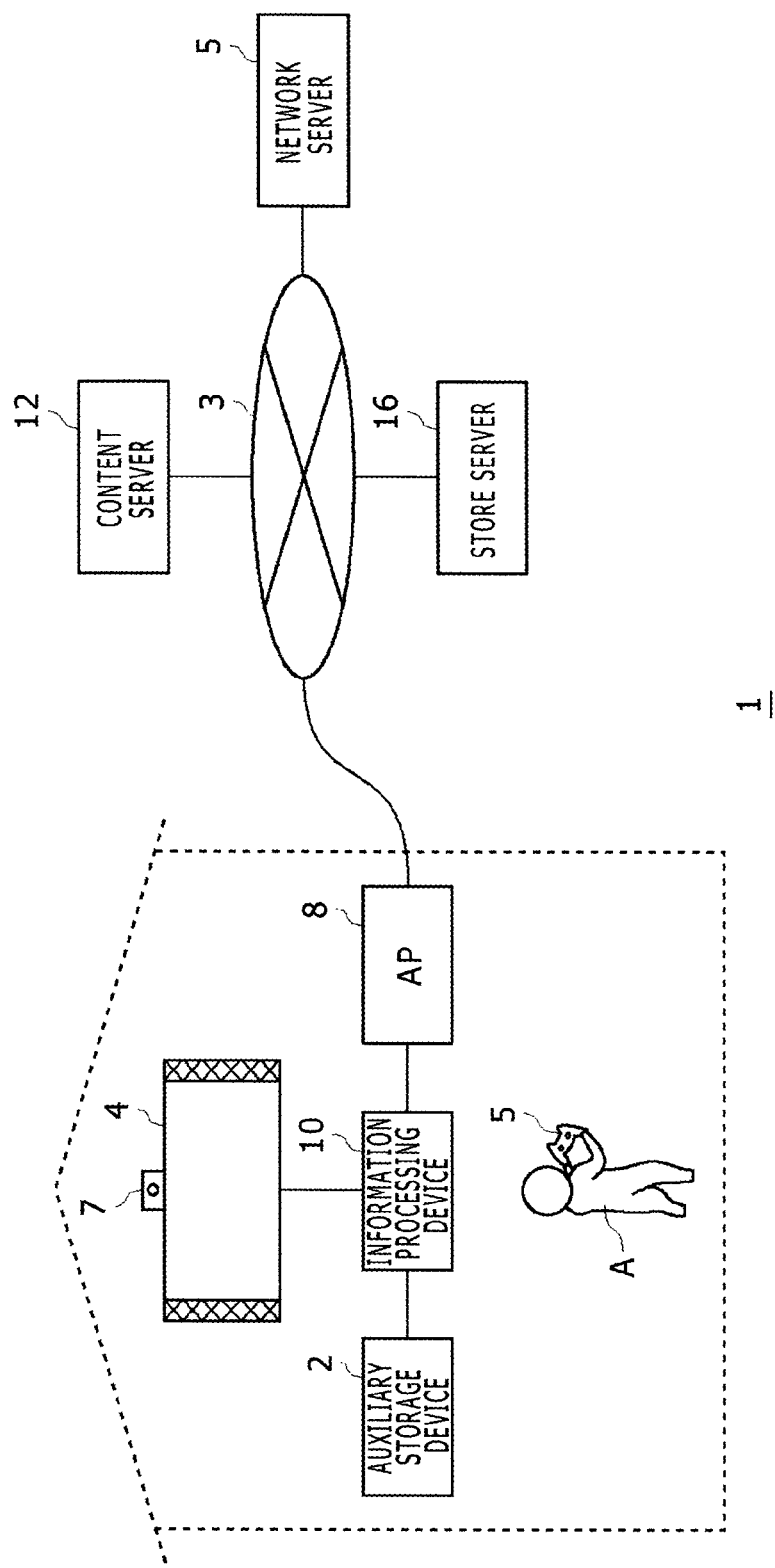
FIG. 1 is a diagram showing an information processing system according to an embodiment of the present disclosure.

FIG. 1 shows an information processing system 1 according to an embodiment of the present disclosure. The information processing system 1 includes an information processing device 10, a network server 5, a content server 12 for distributing digital contents, and a store server 16 for selling the digital contents. The information processing device and the servers are connected to each other via a network 3 such as the Internet, a LAN (Local Area Network), or the like. The content server 12 is maintained and managed by a manufacturer, a publisher, or the like of the digital contents.

An access point (hereinafter referred to as an "AP") 8 has functions of a wireless access point and a router. The information processing device 10 is connected to the AP 8 via radio or wire, and is thus connected to the network server 5, the content server 12, and the store server 16 on the network 3 in such a manner as to be able to communicate with the network server 5, the content server 12, and the store server 16.

The information processing device 10 is connected to an input device 6 operated by a user by radio or wire. The input device 6 outputs operation information indicating a result of operation by the user to the information processing device 10. When receiving the operation information from the input device 6, the information processing device 10 reflects the operation information in processing of OS (system software) or application software, and makes a result of the processing output from an output device 4. In the information processing system 1, the information processing device 10 is a game device for executing game software. The input device 6 may be a device for supplying the user operation information to the information processing device 10, such as a game controller or the like. The user logs in to an OS (system software) of the information processing device 10 to play a game. The user who logs in to the OS is managed by a user account registered in the information processing device 10.

The network server 5 is maintained and managed by an entity that operates the information processing system 1. The network server 5 provides the network service of games to the user of the information processing system 1. The network server 5 manages a network account identifying the user. The user signs in to the network service provided by the network server 5 using the network account. By signing in to the network service from the information processing device 10, the user can purchase digital contents from the store server 16, and receive the digital contents distributed from the content server 12. Incidentally, in the present embodiment, the digital contents may be various types of application software. However, the following description will be made particularly of a case where the digital contents are game software.

An auxiliary storage device 2 is a mass storage device such as an HDD (Hard Disk Drive), a flash memory, or the like. The auxiliary storage device 2 may be an external storage device connected to the information processing device 10 by a USB (Universal Serial Bus) or the like, or may be an internal storage device. The output device 4 may be a television set including a display for outputting an image and a speaker for outputting sound, or may be a computer display. The output device 4 may be connected to the information processing device 10 by a wire cable, or may be connected to the information processing device 10 by radio.

The input device 6 includes a plurality of input portions such as a plurality of push type operating buttons, an analog stick allowing an analog quantity to be input, a rotation type button, and the like. A camera 7 as an imaging device is provided in the vicinity of the output device 4. The camera 7 images a space around the output device 4. FIG. 1 shows an example in which the camera 7 is attached to an upper portion of the output device 4. However, the camera 7 may be disposed on the side of the output device 4. In either case, the camera 7 is disposed in such a position as to be able to image the user playing a game in front of the output device 4. The information processing device 10 has a function of face authentication of the user from an image imaged by the camera 7.

Figure 2:
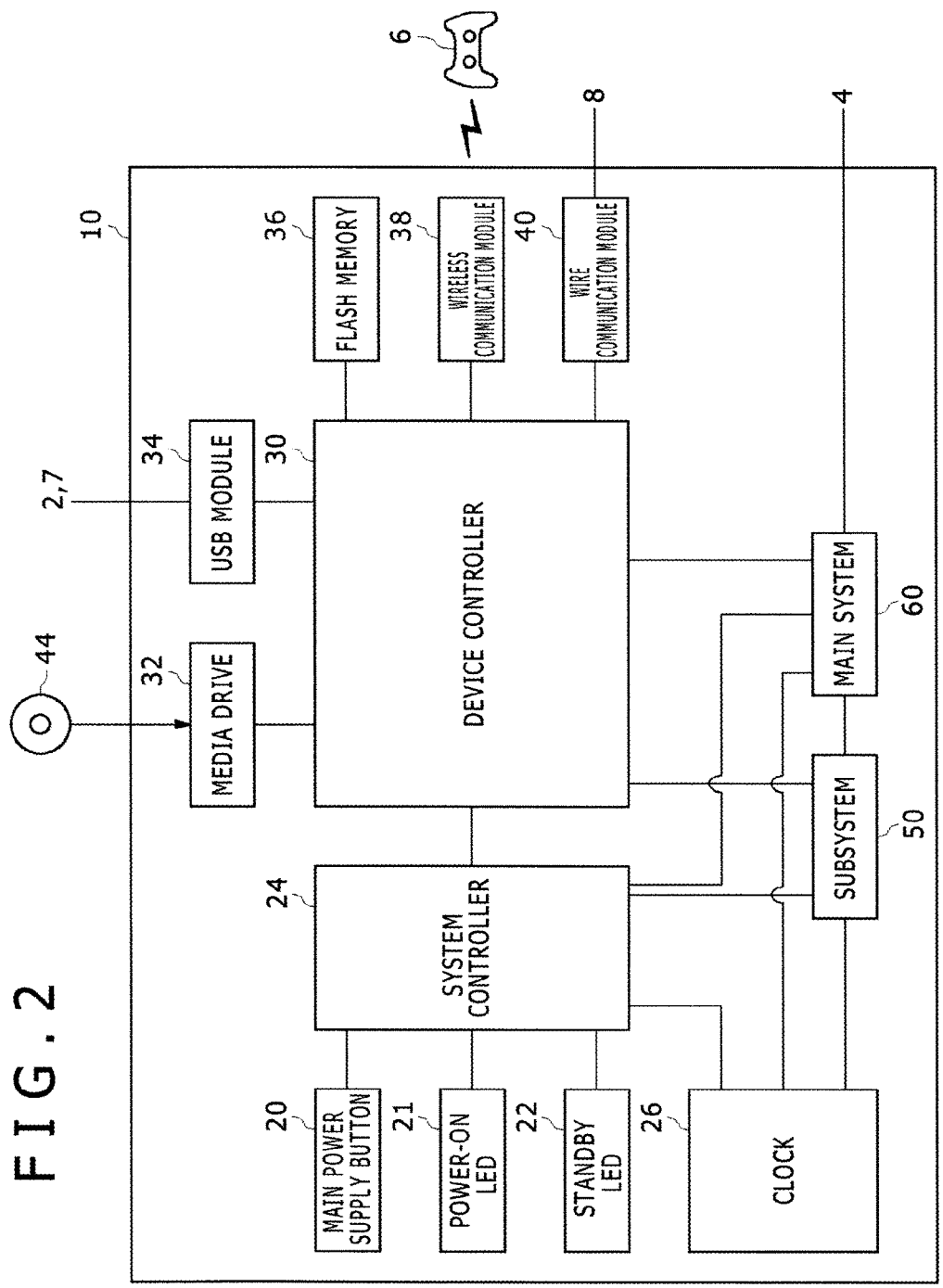
FIG. 2 is a diagram showing functional blocks of an information processing device.

FIG. 2 is a functional block diagram of the information processing device 10. The information processing device 10 includes a main power supply button 20, a power-on LED (light-emitting diode) 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main CPU (Central Processing Unit), a memory as a main storage device and a memory controller, a GPU (Graphics Processing Unit), and the like. The GPU is used mainly for arithmetic processing of a game program. These functions may be constructed as a system on chip, and thus formed on one chip. The main CPU has a function of starting the OS and executing game software recorded in the auxiliary storage device 2 or on the ROM medium 44 under an environment provided by the OS.

The subsystem 50 includes a sub-CPU, a memory as a main storage device and a memory controller, and the like. The subsystem 50 does not include a GPU. The number of circuit gates of the sub-CPU is smaller than the number of circuit gates of the main CPU. The power consumption in operation of the sub-CPU is lower than the power consumption in operation of the main CPU. As described above, the sub-CPU operates while the main CPU is in a standby state, and the processing functions of the sub-CPU are limited to keep the power consumption low. Incidentally, the sub-CPU and the memory may be formed on separate chips.

The main power supply button 20 is an input portion where operating input from the user is performed. The main power supply button 20 is provided to a front surface of a casing of the information processing device 10. The main power supply button 20 is operated to turn on or off the supply of power to the main system 60 of the information processing device 10. Hereinafter, the on state of the main power supply means that the main system 60 is in an active state, and the off state of the main power supply means that the main system 60 is in a standby state. The power-on LED 21 is lit when the main power supply button 20 is turned on. The standby LED 22 is lit when the main power supply button 20 is turned off.

The system controller 24 detects the depression of the main power supply button 20 by the user. When the main power supply button 20 is depressed while the main power supply is in an off state, the system controller 24 obtains the depressing operation as a "turn-on instruction." When the main power supply button 20 is depressed while the main power supply is in an on state, on the other hand, the system controller 24 obtains the depressing operation as a "turn-off instruction."

Whereas the main CPU has a function of executing a game program recorded in the auxiliary storage device 2 or on the ROM medium 44, the sub-CPU does not have such a function. However, the sub-CPU has a function of accessing the auxiliary storage device 2 and a function of transmitting and receiving information to and from the network server 5, the content server 12, and the like. The sub-CPU is configured with only such limited processing functions. The sub-CPU can therefore operate with a low power consumption as compared with the main CPU. These functions of the sub-CPU are performed when the main CPU is in a standby state.

The clock 26 is a real-time clock. The clock 26 generates present date and time information, and supplies the present date and time information to the system controller 24, the subsystem 50, and the main system 60.

The device controller 30 is configured as an LSI (Large-Scale Integrated Circuit) that transfers information between devices like a Southbridge. As shown in FIG. 2, the device controller 30 is connected with devices such as the system controller 24, the media drive 32, the USB module 34, the flash memory 36, the wireless communication module 38, the wire communication module 40, the subsystem 50, the main system 60, and the like. The device controller 30 accommodates differences between electrical characteristics of the respective devices and differences between data transfer rates, and controls data transfer timing.

The media drive 32 is a drive device that is loaded with the ROM medium 44 on which application software such as a game or the like and license information are recorded, drives the ROM medium 44, and reads a program, data, and the like from the ROM medium 44. In the following, programs and data may be referred to collectively as data when the programs and the data are not particularly distinguished from each other. However, data will be used also to represent elements constituting files. The ROM medium 44 is a read-only recording medium such as an optical disk, a magneto-optical disk, a Blu-ray disk, or the like.

The USB module 34 is a module connected to an external device by a USB cable. The USB module 34 may be connected to the auxiliary storage device 2 and the camera 7 by a USB cable. The flash memory 36 is an auxiliary storage device forming an internal storage. The wireless communication module 38 performs wireless communication with the input device 6, for example, under a communication protocol such as a Bluetooth (registered trademark) protocol, an IEEE 802.11 protocol, or the like. Incidentally, the wireless communication module 38 may support a third-generation (3rd Generation) digital mobile telephone system compliant with an IMT-2000 (International Mobile Telecommunication 2000) standard defined by the ITU (International Telecommunication Union), or may further support a digital mobile telephone system of another generation. The wire communication module 40 performs wire communication with an external device. The wire communication module 40 is connected to the network 3 via the AP 8, for example.

Returning to FIG. 1, the content server 12 and the store server 16 provide game software to the information processing device 10. The game software includes a startup file, a resource file group for executing a game such as a game program or the like, and a file group used by the OS of the information processing device 10. The game software provides the image file of game software recorded originally on the ROM medium 44 to the information processing device 10. The game program is necessary to execute the game. The game progresses by running the game program. The startup file is a program for starting the game program. When the startup file is executed, the game program is called up and executed. The file group used by the OS includes for example a game icon image to be displayed on a menu screen in the information processing device 10.

The game software has a tree type directory structure. A root directory includes the startup file. Subdirectories at a lower level are classified by file type. For example, a subdirectory for a 3D (three-dimensional) model, a subdirectory for texture, a subdirectory for a script, and the like are formed as the subdirectories.

Figure 3:
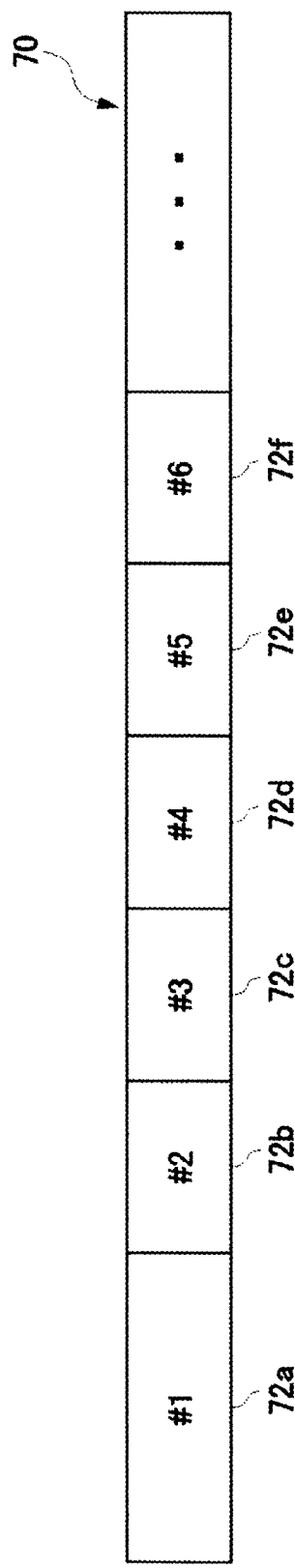
FIG. 3 is a conceptual diagram showing a file configuration of game software.

FIG. 3 shows a file configuration of the game software. Main body of game software 70 according to the present embodiment is formed by a plurality of files, and is logically divided into a plurality of groups 72, as shown in the figure. Each file belongs to at least one of the plurality of groups 72, and at least one file belongs to each group 72. The game software 70 shown in FIG. 3 includes a first group 72a as a front group, and a second group 72b, a third group 72c, a fourth group 72d, a fifth group 72e, and a sixth group 72f as groups following the first group 72a. Incidentally, there may be a seventh and subsequent groups 72 following the sixth group 72f. Each group is identified by a group number such as the first, the second, or the like.

The files included in the plurality of subdirectories belong to the respective groups that are divided logically. That is, each group is formed by files of different types, and is set such that files necessary for the information processing device 10 to execute a particular unit such as a scene, a stage, or the like in the game belong to each group.

A program file and a data file necessary to start the game software 70 belong to the first group 72a. Hence, when the information processing device 10 obtains the game software 70 from the content server 12 or the store server 16, if the information processing device 10 has downloaded all of the files belonging to the first group 72a, the information processing device 10 can immediately start the game software 70 even if the information processing device 10 has not downloaded the files of the following second group 72b and the subsequent groups. Incidentally, after the information processing device 10 has obtained all of the files belonging to the first group 72a and started the game software 70, the information processing device 10 downloads the files belonging to the following groups 72 in the background. The download waiting time of the user can be shortened by thus making a minimum of files necessary to execute the game downloaded first and allowing the game to be executed at a point in time that these files are obtained. Incidentally, in the present embodiment, the game software 70 recorded on the ROM medium 44 and the game software 70 downloaded from the content server 12 or the like have a data structure with a same file and directory configuration.

Figure 4:
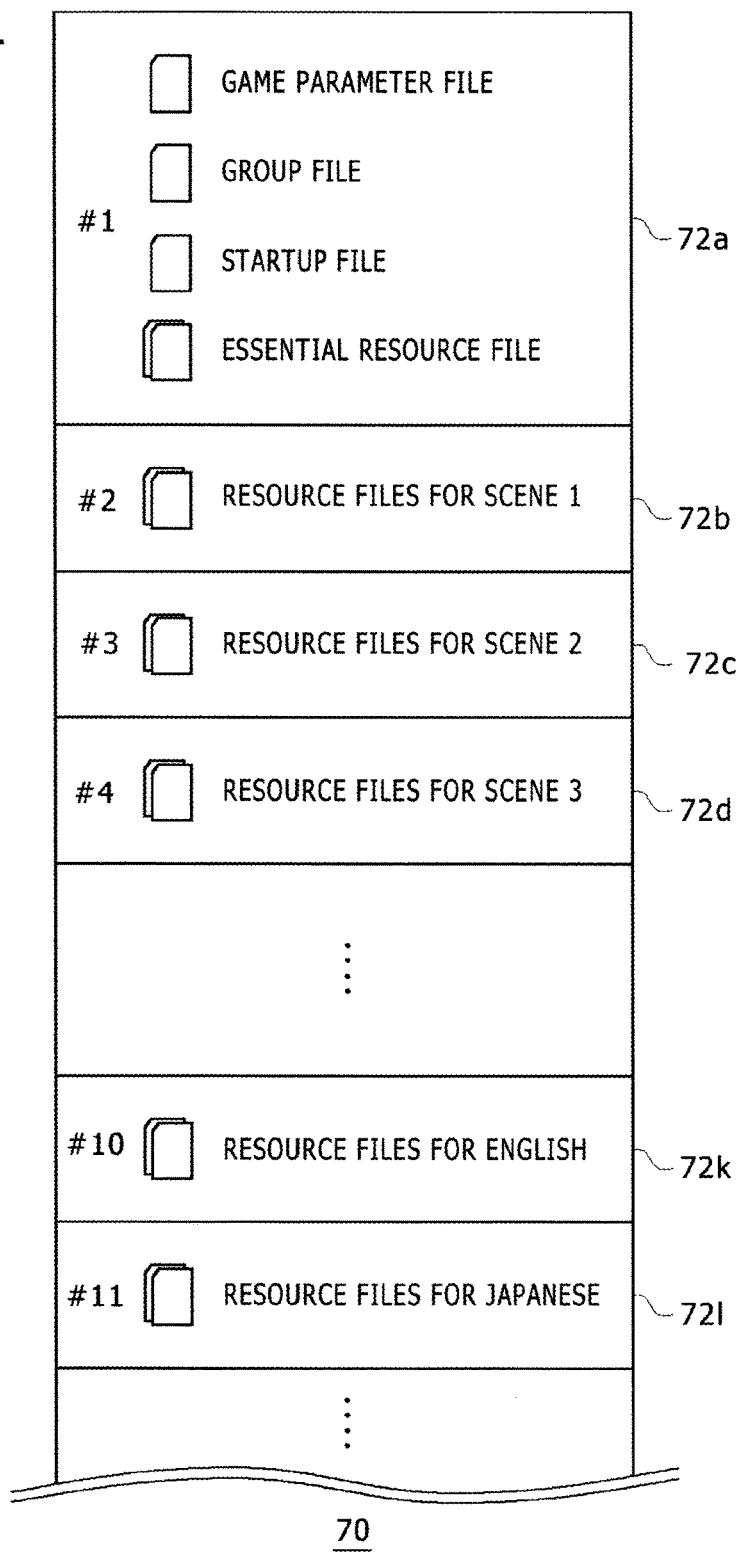
FIG. 4 is a diagram showing a concrete example of the file configuration of the game software.

FIG. 4 shows a concrete example of file configuration of the game software. The first group 72a is formed by a file group to be downloaded first in the game software 70. In this case, a game parameter file, a group file, a startup file, and an essential resource file are shown as the first group 72a.

Here, the game parameter file is used by the OS of the information processing device 10. The game parameter file includes for example information such as a title ID (identification), a display resolution, and the like, icon image data, and the like.

The group file is a definition file describing in which group each file is included. For example, the group file may be represented in XML (extensible markup language). However, the group file may be represented in another program language in any form. The group file will be described later with reference to FIG. 5 and FIG. 6.

The startup file is a program for starting the game program. The essential resource file includes a resource file such as a program essential for the execution of the game or the like, a common file used in the whole of the game, and the like.

When the information processing device 10 downloads the game software 70 from the content server 12 or the like, the information processing device 10 can start the game when obtaining all of the file group belonging to the first group 72a. Conversely, the first group 72a includes a file group necessary for the user to play a part of the game. Incidentally, the game play in this case may also include a setting action performed at a time of a start of the game, such for example as determination of a character or determination of a game level by the user. That is, the first group 72a includes a file group necessary to start the game and allow the user to perform at least some operation. The game play that can be performed using the file group included in the first group 72a may be for example only an initial setting for the game or such that up to a first stage of the game can be played. This depends on the game manufacturer.

In the example shown in FIG. 4, a plurality of resource files for scene 1 belong to the second group 72b, a plurality of resource files for scene 2 belong to the third group 72c, and a plurality of resource files for scene 3 belong to the fourth group 72d. Specifically, the plurality of resource files are 3D model files, texture files, script files, and the like for the particular scenes, and include files included in the plurality of subdirectories of the directory structure. In addition, resource files for English belong to a tenth group 72k, and resource files for Japanese belong to an eleventh group 72l.

Many of recent games are created so as to be executable in a plurality of countries of different languages. Audio data and image data are created so as to correspond to a plurality of languages, and audio files and image files for the plurality of languages are included in one piece of packaged software. Such files may hereinafter be referred to as "language-dependent" files. The audio files and the image files basically tend to have a large data size. The data size of such language-dependent files may account for a considerable proportion of the data size of the whole of the game software. Accordingly, the game software 70 according to the present embodiment includes groups of resource files for languages in which groups audio files and image files are collected on a language-by-language basis, in order that only necessary language-dependent files can be obtained.

Figure 5:
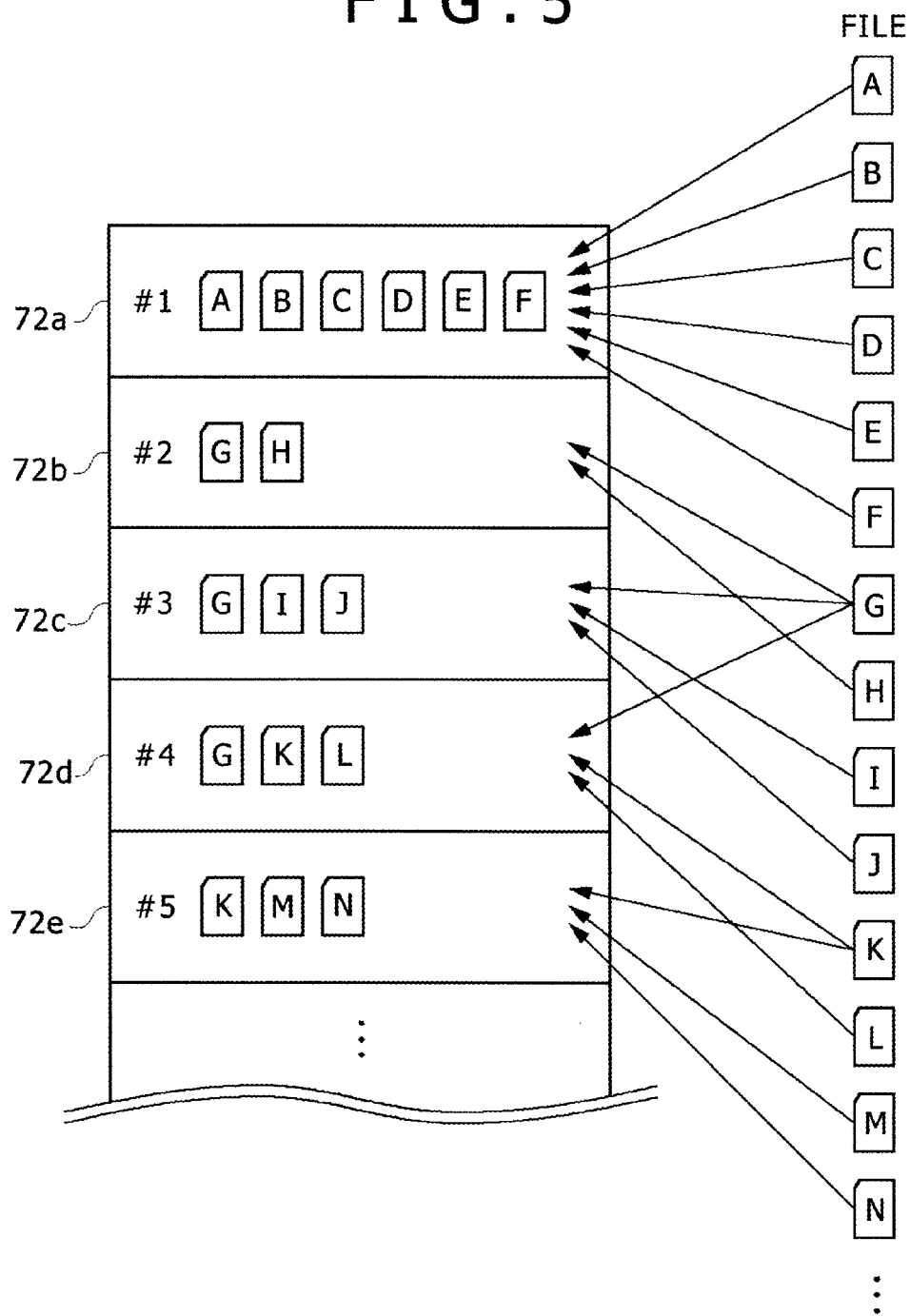
FIG. 5 is a diagram showing an example of relation between groups and files.

FIG. 5 shows an example of relation between groups and files. In this case, files A to N are shown belonging to respective groups 72. As shown in the figure, each file belongs to at least one of a plurality of groups 72, and at least one file belongs to each group 72. Incidentally, the file G belongs to the second group 72b, the third group 72c, and the fourth group 72d. This means that the file G is necessary to form scene 1, scene 2, and scene 3 in the game. One file may thus belong to a plurality of groups. Incidentally, the file K also belongs to a plurality of groups 72, that is, the fourth group 72d and the fifth group 72e.

Figure 6:
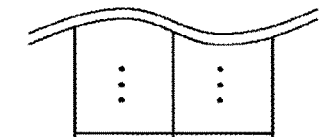
FIG. 6 is a diagram showing an example of a group file.

FIG. 6 shows an example of a group file. As described above, the group file may be represented in XML, or may be represented in another program language. FIG. 6 shows a group file representing correspondence relation between groups and files in a table format to facilitate understanding. When the information processing device 10 downloads each file of the game software 70, the information processing device 10 can determine whether all files belonging to a certain group are obtained or not obtained by referring to the group file. For example, as for the first group 72a, the information processing device 10 can recognize that the files belonging to the first group 72a are files A, B, C, D, E, and F by referring to the group file. Thus, when these files are recorded in the auxiliary storage device 2, the information processing device 10 determines that all of the files belonging to the first group 72a are obtained.

As described above, the game software 70 includes various game files. The data structure of game data according to the present embodiment will be described in the following. In the present embodiment, the game data is configured using a file management method used in UNIX (registered trademark). The game data includes at least the main body (constituted of a plurality of game files) of the game software 70 described above and metadata.

A file is configured with one or a plurality of blocks allocated thereto. A block is a basic unit for a file system to transfer data. One block is set to a predetermined data size (for example 64 Kbytes). Therefore, in a case of a file of 1280 Kbytes, 20 blocks are allocated to the file. Set for each file is an index table for storing one or more recording locations of one or more data blocks constituting the file.

Figure 7:
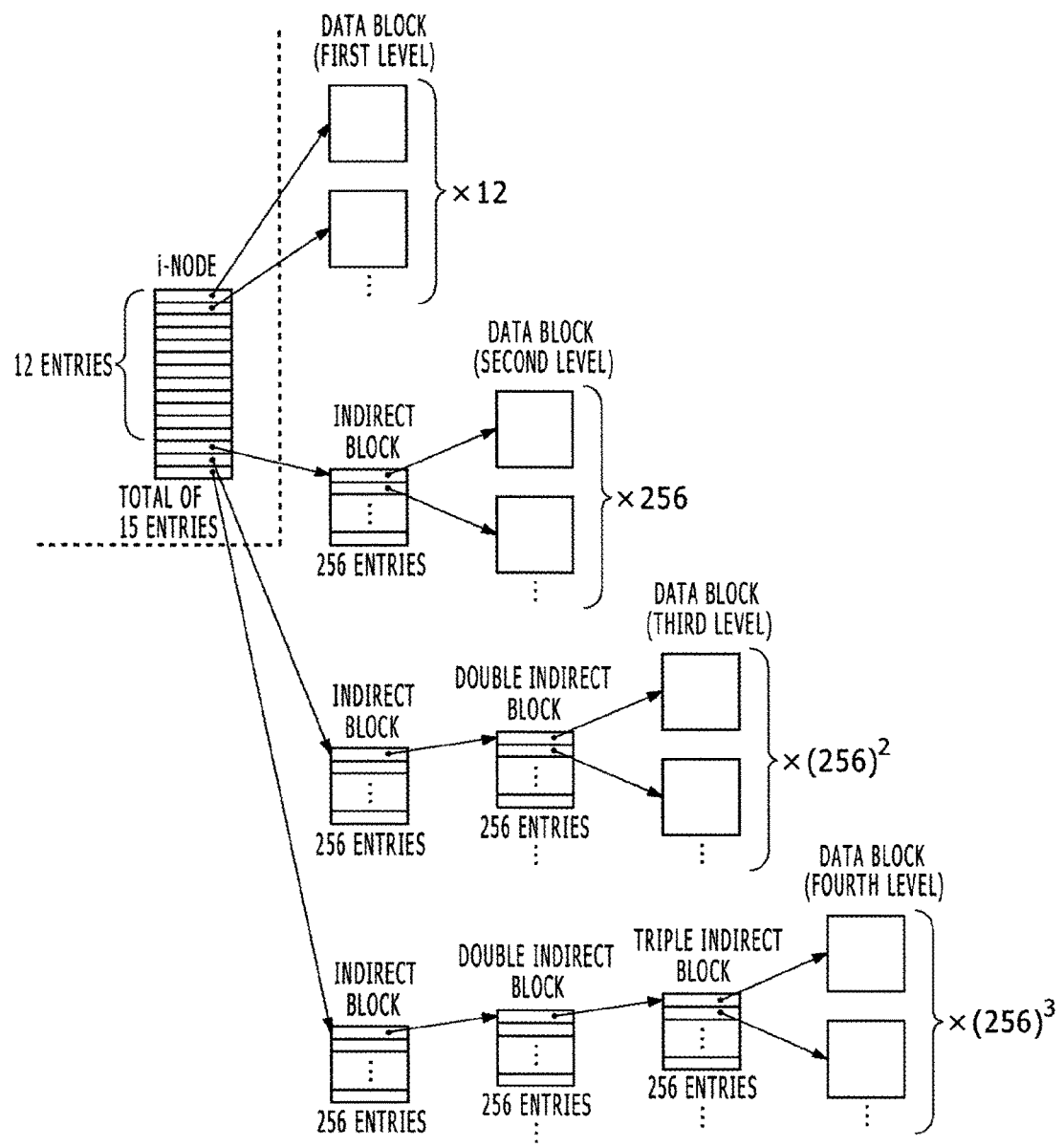
FIG. 7 is a diagram of assistance in explaining an example of file space allocation.

FIG. 7 is a diagram of assistance in explaining a reference example of a data structure used for addressing the data blocks of a game file. A first index table at a first level is referred to as an index node ("i-node" for short), and has a total of 15 entries for addressing the data blocks. All files are constituted of an i-node and data blocks. The i-node is given an i-node number for identifying the file in the file system. The i-node has, as attribute information, the i-node number, the type of the file, the byte length of the file, an access right, and the like.

In the data structure shown as a reference example, information for identifying the recording locations of the data blocks is recorded in the entries of the i-node. This information may be block numbers that specify a relative position from a start of a recording disk or a partition, for example. Incidentally, the information for identifying the recording locations of the data blocks is not limited to block numbers, but may be for example information such as a block size for calculating a block number, a file offset, or the like. In addition, the information for identifying the recording locations of the data blocks may be sector numbers of the recording disk which sector numbers directly identify the recording locations.

A file name and the i-node number (having a meaning as a pointer to the i-node) of the i-node managing the file are retained in association with each other in a data block of a directory. Hence, when the game program refers to the file by the file name, the kernel of the OS refers to information of a directory entry, obtains the i-node number corresponding to the file name, and accesses the file using the block numbers included in the i-node identified by the i-node number.

The 12 entries of the i-node are used to record the block numbers of 12 data blocks from a start within the file. Hence, when the file is formed by 12 or fewer data blocks, the i-node can record the block numbers of the respective data blocks using entries the number of which is equal to the number of the blocks.

Incidentally, when the file is formed by 13 or more blocks, index tables at a plurality of levels are necessary. In the example shown in FIG. 7, the block number of an index table at a second level (indirect block) is recorded in the 13th entry of the i-node. The 13th entry of the i-node is linked to the indirect block, and is thus used for indirect reference in a first stage. The indirect block has a fixed data size, and has 256 entries. The block numbers of data blocks at the second level are recorded in the entries of the indirect block.

The block number of an index table at the second level (indirect block) for linking an index table at a third level (double indirect block) is recorded in the 14th entry of the i-node. The block number of the double indirect block is recorded in an entry of the indirect block. The double indirect block has 256 entries. The block numbers of data blocks at the third level are recorded in the entries of the double indirect block. The 14th entry of the i-node is thus used for indirect reference in a second stage.

The block number of an index table at the second level (indirect block) for linking an index table at the third level (double indirect block) for linking an index table at a fourth level (triple indirect block) is recorded in the 15th entry of the i-node. The block number of the double indirect block is recorded in an entry of the indirect block. The block number of the triple indirect block is recorded in an entry of the double indirect block. The triple indirect block has 256 entries. The block numbers of data blocks at the fourth level are recorded in the entries of the triple indirect block. The 15th entry of the i-node is thus used for indirect reference in a third stage.

The index tables at the second and subsequent levels (that is, the index tables other than the i-node) may hereinafter be referred to collectively as indirect blocks.

In the data structure of the game file shown as a reference example, each entry of the index tables also stores the hash value of data included in the data block together with the block number. The hash value is for example a data value of 32 bytes. Recording the hash value of the data within the data block in the entry in which the data block is registered enables the data to be verified when the data of the block is read out, and also enables the data to be prevented from being tampered with.

As described above, an indirect block has a fixed data size. When an indirect block is used as an index table, a region of a fixed length needs to be secured. For example, in a case where the number of blocks of one game file is 20, the data blocks are registered in the 12 entries of an i-node and eight entries of an indirect block at a second level, and respective block numbers and hash values are recorded in the entries. As a result, 248 (=256−8) remaining entries of the indirect block at the second level are empty, and are thus unnecessary regions that do not contribute as metadata.

The main body of the game software 70 includes a plurality of game files, for example more than 10000 game files. In this file system, for a purpose of reading out the game files, the metadata recorded in the i-nodes and the indirect blocks is all expanded in a memory such as DDR3 (double-data-rate3) or the like. Incidentally, it is desirable to also read out as many game files as possible into the memory. Hence, the data size of the metadata is desirably as small as possible.

However, as described above, when there is a large amount of null data in entries of indirect blocks, the null data is also expanded in the memory, and consequently decreases the memory space. In the case of the game software 70 including more than 10000 files, in particular, when index tables for each file are prepared, metadata including null data may exceed 1 Gbytes.

Figure 8:
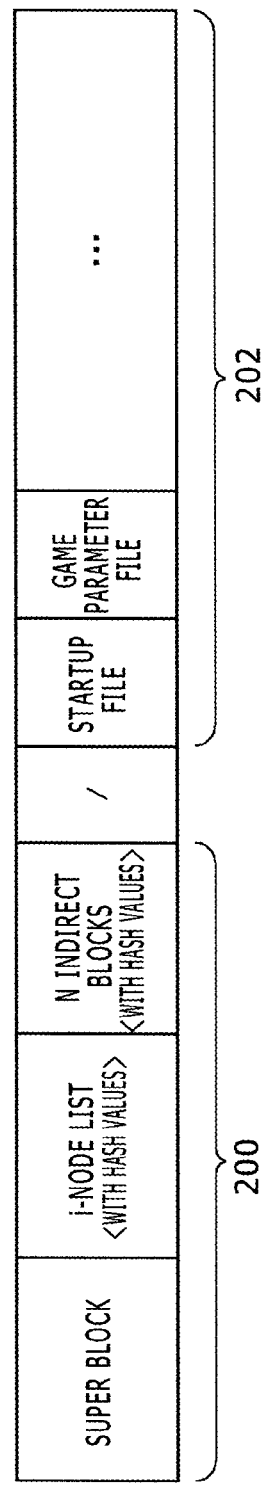
FIG. 8 is a diagram showing a reference example of a data structure of game data.

FIG. 8 shows a reference example of a data structure of game data. The data structure shown in the present reference example is obtained by adding a metadata region 200 including a super block, an i-node list, and a plurality of (N) indirect blocks to a game data region 202 including a plurality of (for example 10000) game files. The super block has recorded therein information for managing the files included in the game data region 202, and includes metadata such as a block size, a total number of blocks, and the like. The i-node list includes i-nodes equal in number to at least the number of files included in the game data region 202 (for example 10000). (Incidentally, to be exact, in this file system, directories and file names are also treated as one file, and therefore the i-node list also includes an i-node related to the directories and the file names.)

The indirect blocks are provided for files whose data blocks cannot be registered in the 12 entries of the i-node. In the present reference example, as already described, entries of the i-nodes and the indirect blocks include block numbers and the hash values of data included in the data blocks.

Therefore, when the game data region 202 includes the 10000 files, there are a large number of indirect blocks. In some indirect blocks, most of the entries may include null data, as described above. The data size of the metadata region 200 therefore becomes unnecessarily large. It is not desirable from a viewpoint of efficient use of the memory to expand the metadata included in the metadata region 200 in the memory during execution of the game program.

Accordingly, game data in the present embodiment has a data structure in which the data size of metadata is minimized, rather than the data structure having a hash value for each block of each file. Specifically, a completely plain text image file in which a plurality of files without a signature (hash value) are lumped together is created, and game data obtained by adding metadata to the image file is created. Incidentally, the image file refers to one formed as one file including the structure of a file system, control information, and the like.

With the data structure of this game data, a plurality of files are recorded in consecutive locations (blocks) on a recording medium. Thereby, the recording location of each file can be identified when a start position and a file size are retained as metadata in an entry of an i-node. It therefore becomes unnecessary to have information for identifying the recording location of each data block such as a block number or the like. In addition, by not attaching a signature for each data block, it becomes unnecessary to have a hash value for each data block as metadata of each file. Thus, the metadata of each file can be contained in the entries of an i-node. That is, when no hash value is generated for each block, and further the data blocks are recorded in blocks of consecutive numbers, indirect blocks are rendered unnecessary, so that the data size of the metadata can be reduced greatly.

Figure 9:
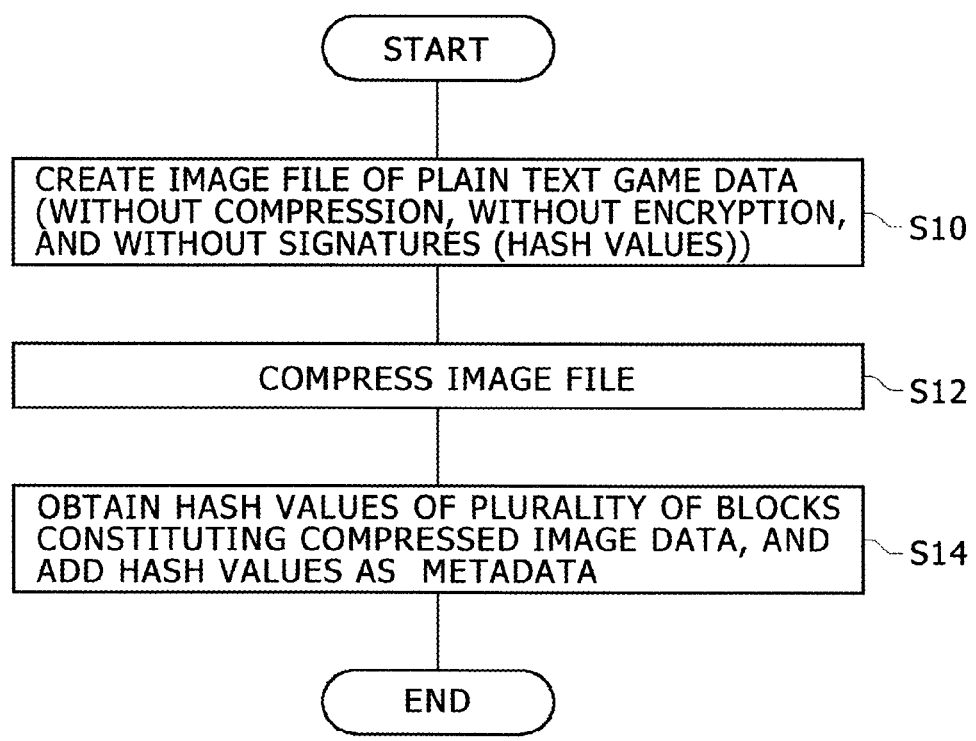
FIG. 9 is a flowchart of a game data creating method.

FIG. 9 is a flowchart of a game data creating method. Steps shown in the flowchart represent a process in which a game manufacturer creates final game package software, and are implemented by package creating software. First, the package creating software creates an image file of plain text game data (without compression, without encryption, and without signatures) (S10). As already described, the image file is formed as one file including the structure of a file system, control information, and the like.

FIG. 10A shows an example of the completely plain text image file of the game data in the present embodiment. The image file 210 has a data structure obtained by adding a metadata region 204 including a super block, an i-node list, a super root directory, and a flat path table to a game data region 202 including a plurality of (for example 10000) files. The super root directory and the flat path table will be described later. The super block has recorded therein information for managing the files included in the game data region 202, and includes metadata such as a block size, a total number of blocks, and the like.

Logical blocks having consecutive numbers are allocated to the plurality of game files included in the game data region 202. The arrangement of the blocks allocated to the plurality of game files included in the game data region 202 enables the storage location of one game file on the recording medium to be identified by a start block number to which the file is allocated and the data size of the file. Therefore, the recording location of the file is identified by recording the start block number of the file and the data size of the file in the i-node of the game file. Thus, when the OS accesses the game file, the recording location of the game file can be identified by obtaining the i-node number of the game file.

No signature is attached to the game files recorded in the game data region 202. Thus, there is no hash value for each block. Hence, it is not necessary to prepare indirect blocks for recording the metadata of a file, and the metadata of the file can be contained in one entry of the i-node. Therefore, the i-node list in the metadata region 204 includes i-nodes equal in number to the number of files in the game data region 202. On the other hand, as is clear from comparison with FIG. 8, the metadata region 204 does not include a plurality of indirect blocks related to the files. Incidentally, as already described, in this file system, directories and file names are also treated as one file. Thus, the i-node list also includes an i-node related to the directories and the file names. In this case, however, no signature is attached to the directories and the file names, so that indirect blocks do not need to be prepared.

A comparison with the metadata region 200 shown in FIG. 8 shows that the data size of the metadata region 204 shown in FIG. 10A can be reduced greatly because the metadata region 204 does not include indirect blocks. Therefore, even when the metadata included in the metadata region 204 is read out into the memory such as DDR3 or the like during execution of the game program, the metadata has only a small data size.

Returning to FIG. 9, the package creating software compresses the plain text image file 210 shown in FIG. 10A (S12). FIG. 10B shows an example of the compressed image file. The package creating software allocates logical blocks having consecutive numbers to the compressed image file 212. In the compressed image file 212, a compression table indicating relation between the blocks of the files before the compression and after the compression is written to the metadata region 204. The size of the plain text image file 210 before the compression is described in the header part of the compression table, and the block numbers before the compression, the block numbers after the compression, and offset positions within the blocks of the block numbers after the compression are described in association with each other in the table part of the compression table. Such compression reduces the data size of a game data region 206 as compared with the data size of the game data region 202.

The image files 210 and 212 shown in FIG. 10A and FIG. 10B can be used as an image file of game data as they are. That is, when the OS in the information processing device 10 mounts the image file 210 or 212 at a predetermined mount point for executing the game (which mount point will hereinafter be referred to as an execution mount point), a startup file is started to execute the game program. At this time, the data size of the metadata region 204 can be made small without including indirect blocks, so that the metadata can be expanded in the memory efficiently.

However, no signature is attached to the image files 210 and 212. There is thus a disadvantage in that when the data of the blocks is read out, the data cannot be verified, and the data cannot be effectively prevented from being tampered with. Accordingly, in the present embodiment, the image file 212 in an archive format is treated as one file, a signature is attached, and further encryption is performed to create secure game data. Incidentally, while a signature and encryption are applied to the image file 212 to reduce the data size of the game data as a whole, a signature and encryption may be applied to the image file 210 before the compression to create secure game data.

The package creating software regards the compressed image file 212 as one file, and allocates logical blocks having consecutive numbers to the image file 212. The package creating software attaches a signature to each of the plurality of blocks constituting the compressed image file 212, or specifically obtains a hash value of each piece of block data, and adds the signature as metadata to the image file 212 (S14). Incidentally, in order to enhance the security of the game data, the package creating software may attach a signature to the created metadata, and further perform encryption processing on the metadata and the main body of the game data.

Figure 11:
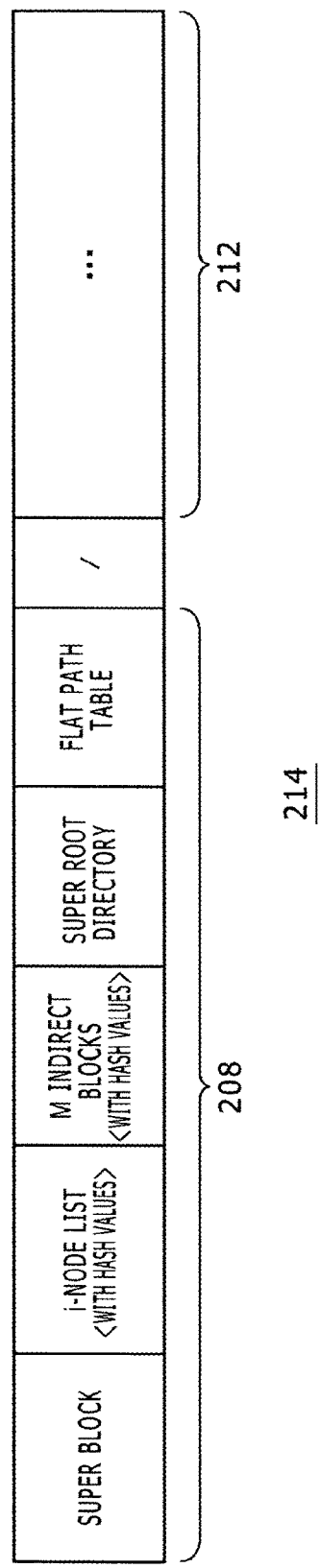
FIG. 11 is a diagram showing an example of a data structure of game data according to a present embodiment.

FIG. 11 shows an example of a data structure of game data according to the present embodiment. The game data having this data structure is recorded as a package file 214 on the ROM medium 44, or downloaded as a package file 214 from the content server 12 or the store server 16 to the information processing device 10 and recorded on the auxiliary storage device 2.

As shown in FIG. 11, the package file 214 has a data structure in which the image file 212 is nested. The data structure according to the present embodiment is obtained by adding a metadata region 208 including a super block, an i-node list, a plurality of (M) indirect blocks, a super root directory, and a flat path table to the image file 212 treated as one file.

The super block has recorded therein information for managing the image file 212, and includes metadata such as a block size, a total number of blocks, and the like. Metadata including the hash values of respective blocks of the image file 212 is recorded in entries of the i-node of the image file 212 which i-node is included in the i-node list and a plurality of indirect blocks, the entries including at least a number of entries which number is equal to the number of blocks obtained by dividing the image file 212 regarded as one file. The package file 214 is thus formed with a data structure obtained by adding metadata including at least a signature (hash value) attached to each of the plurality of blocks constituting the image file 212 to the image file 212 of the game data including a plurality of files that are each assigned one or a plurality of blocks and including the metadata of these files. It is to be noted that, as already described, no signature is attached to the blocks of the respective files included in the image file 212.

The package file 214 recorded on a recording medium (the ROM medium 44 or the auxiliary storage device 2) has the data structure in which the image file 212 is nested. The kernel of the OS can therefore access each of the files included in the game data region 202 by mounting the package file 214 twice.

In mount processing in a first stage, the kernel mounts the package file 214 at a first mount point to be able to recognize the file system of the package file 214. Specifically, the kernel uses the metadata included in the metadata region 208 of the package file 214 to be able to recognize the image file 212, and can thereby view the image file 212 as one file. This mount function is implemented by the kernel operating as a first mount processing section.

In mount processing in a second stage, the kernel mounts the image file 212 at a second mount point (execution mount point) for executing the game program to be able to recognize the file system of the image file 212. Specifically, the kernel uses the metadata included in the metadata region 204 of the image file 212 to be able to recognize the game data region 206, and can thereby access the plurality of (for example 10000) game files included in the game data region 206. This mount function is implemented by the kernel operating as a second mount processing section. Incidentally, the first mount point in the mount processing in the first stage may be the same as or different from the second mount point in the mount processing in the second stage.

After the mount processing in the second stage, the kernel executes the startup file. Incidentally, the startup file is not compressed in the game data region 206. The kernel can therefore start the startup file as it is. Because of a small data size of the metadata region 204 of the image file 212, the metadata can be expanded in the memory such as DDR3 or the like efficiently.

The flat path table included as metadata in the metadata region 204 of the image file 210 or 212 will be described in the following.

In the file management method used in UNIX according to the present embodiment, directories and file names are also treated as a kind of file, as already described, and therefore directories and file names are assigned one block, and recorded. For example, when there is a directory structure "user/AAA/BBB/CCC/file name," one block is allocated to each of the directory names and the file name. A total of five blocks are therefore necessary.

In particular, the number of directories is increased as the number of files of the game data is increased. As already described, the i-nodes of the files need to be read out as metadata into the memory such as DDR3 or the like. Thus, a capacity for the metadata is desirably reduced in scale as much as possible. Accordingly, in the data structure according to the present embodiment, the full path information (user/AAA/BBB/CCC/file name) shown in the above-described example is not used as metadata, but a flat path table is used for a purpose of reducing the metadata capacity.

The flat path table is configured as a correspondence file associating the hash value of full path information of a game file with information for identifying the recording location of the game file. It is desirable that the hash values of full path information of all game files that may be read out from the game program and information for identifying the recording locations of the game files be recorded in association with each other in the flat path table. Here, the information for identifying the recording location of the file may be an i-node number that uniquely identifies the file recorded on the recording medium. Hence, for example the hash value of the full path (user/AAA/BBB/CCC/file name) and the i-node number of the corresponding file are recorded in association with each other in the flat path table according to the present embodiment. When the game program outputs a file readout request including the full path information, a file readout API (Application Programming Interface) in the OS sequentially obtains the hash value of the full path, searches for the i-node number in the flat path table using the hash value, and identifies the blocks constituting the file.

FIG. 12A shows an example of the flat path table. In the flat path table 220, the hash value of each piece of full path information and the i-node number corresponding to the full path information are recorded in association with each other. Here, the hash value is formed as a value of four bytes, for example. Therefore the hash value of the full path information can be formed so as to be represented by a very small amount of data as compared with the amount of data of the full path information. In the flat path table 220, the hash values of full path information are arranged in descending order. In this case, the hash values are expressed as hexadecimal numbers for the convenience of description.

On the other hand, when hash values are used, the hash values of a plurality of pieces of full path information can be the same. This is generally referred to as a "collision of hash values." In the flat path table 220, the full path information is replaced with hash values represented by a small amount of data, and therefore a collision between hash values can occur. In that case, the same hash values associated with different i-node numbers coexist. Thus, in order to distinguish these hash values from each other, the flat path table 220 defines a collision file 222 as a file accompanying the flat path table 220.

FIG. 12B shows an example of the collision file. In the collision file 222, for full path information whose hash values collide with each other, file names and information (i-node numbers in this case) for identifying the recording locations of the files are recorded in association with each other.

Description will be made of "i-node NUMBER/OFFSET" in a right item in the table of FIG. 12A. This item is expressed by four bytes, for example, and at least information indicating the presence or absence of a collision is set in a high-order bit. Suppose that in one example, this information is prepared as a collision flag, and that a collision flag 1 is set when there is a collision and a collision flag 0 is set when there is no collision.

Hence, in the flat path table 220, for a hash value whose duplicate hash value is not present (non-colliding hash value), the collision flag of a high-order bit is set to zero, and an i-node number is described in the low-order bits. When the game program outputs a file readout request specifying full path information, the file readout API in the OS obtains the hash value of the full path information, and searches for an i-node number in the flat path table expanded in the memory using the hash value. At this time, when the corresponding hash value is a non-colliding hash value (that is, when the collision flag is set to zero), the file readout API identifies the i-node number described in the right item of the table, and reads out the file.

On the other hand, in the flat path table 220, for a hash value whose duplicate hash value is present (colliding hash value), the collision flag of a high-order bit is set to one, and offset information is described in the low-order bits. Here, the offset information indicates an offset of a recording location with respect to the collision file, and is information identifying a first location at which the data included in the collision file is described. When the game program outputs a file readout request specifying full path information, the file readout API in the OS obtains the hash value of the full path information, and searches for an i-node number in the flat path table expanded in the memory using the hash value. At this time, when the corresponding hash value is a colliding hash value (that is, when the collision flag is set to one), the file readout API accesses the collision file using the offset information, and searches for the data recorded in the collision file.

For example, when the hash value of the full path information specified by the readout request is "012B341C," and the collision flag is set to one in the right item of the table, the readout API refers to the collision file, and searches for the file name of the file requested to be read out. As shown in FIG. 12B, in the collision file, file names and i-node numbers are recorded in association with each other. The readout API searches the inside of the collision file, and finds the file name of the file requested to be read out. An i-node number is associated with the file name in the collision file. Thus, the readout API can identify the i-node number on the basis of the file name, and read out the file.

The amount of metadata read out into the memory during program execution can be reduced by thus preparing the flat path table and the collision file in place of full path information in the metadata region 204 of the image file 210 or 212.

Description will next be made of a super root directory.

Figure 13A:
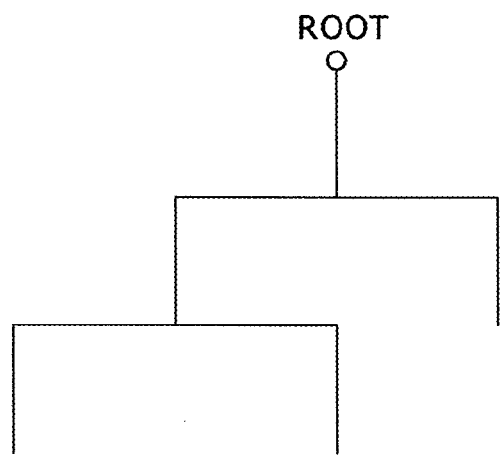
FIG. 13A is a diagram showing an ordinary root directory and subdirectories at lower levels.

FIG. 13A shows an ordinary root directory and subdirectories at lower levels. The subdirectories are formed for each type of file necessary for the execution of the game program. The kernel can execute the game program by mounting the root directory at a predetermined execution mount point.

Figure 13B:
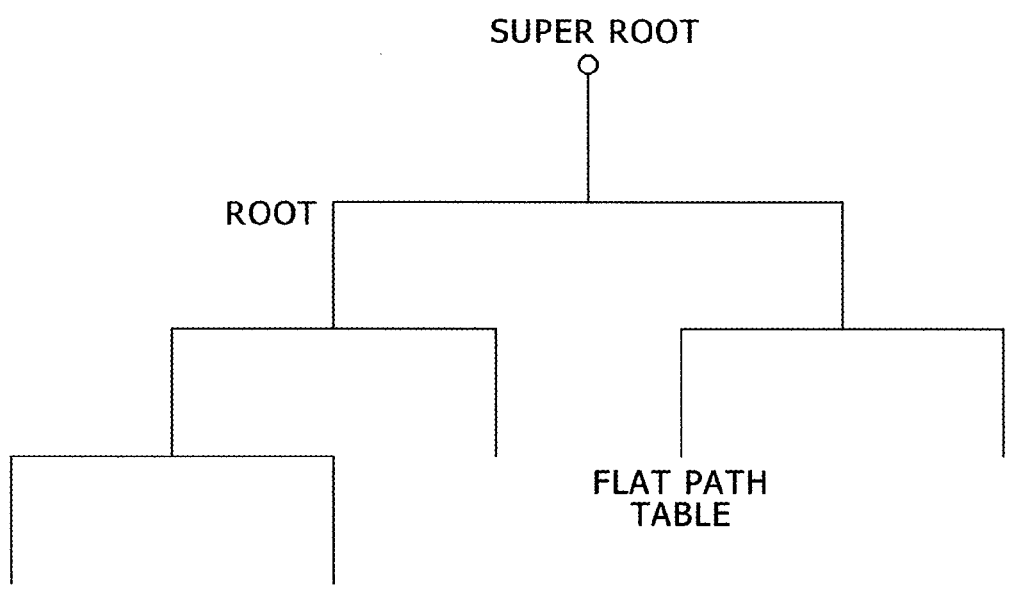
FIG. 13B is a diagram showing a super directory and subdirectories at lower levels.

FIG. 13B shows a super root directory used in the present embodiment and subdirectories at lower levels. The super root directory is set at a level higher than that of the root directory, and the root directory is a subdirectory of the super directory. Incidentally, also in the directory structure shown in FIG. 13B, the kernel can execute the startup file of the root directory by mounting the super root directory. Because the super directory at the higher level is provided, a subdirectory can be added easily to a level lower than that of the super directory branching separately from the root directory without any changes at the levels lower than that of the root directory. This for example enables the file of the flat path table to be disposed at a level lower than that of the super directory. Thus, a file system excellent in extensibility can be provided.

Figure 14:
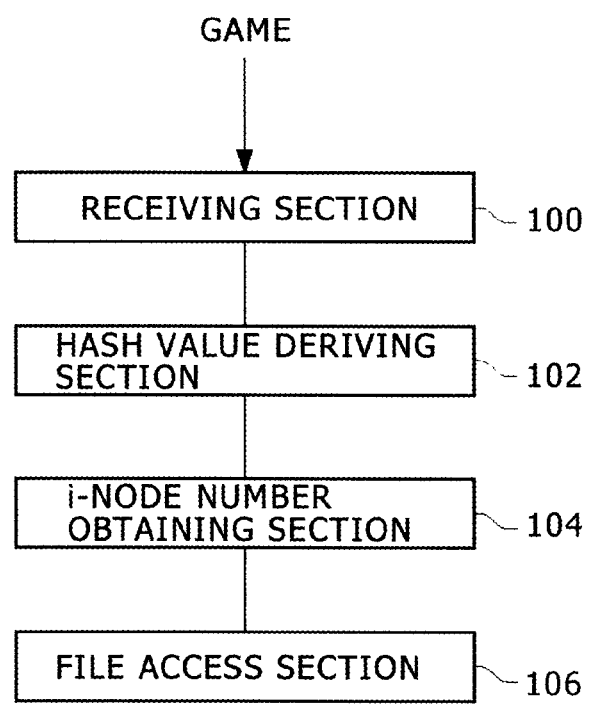
FIG. 14 is a diagram showing a configuration for implementing a file access function.

FIG. 14 shows a configuration for implementing a file access function of accessing a file included in the game data. The information processing device 10 includes a receiving section 100, a hash value deriving section 102, an i-node number obtaining section 104, and a file access section 106. These constituent elements are implemented, in terms of hardware components, by the CPU of an arbitrary computer, a memory, a program loaded in the memory, a storage, and the like. In this case, however, the functional blocks implemented by cooperation of these components are depicted. Hence, it is to be understood by those skilled in the art that these functional blocks can be implemented in various forms by only hardware, only software, or a combination of hardware and software. Here, the functions of the receiving section 100, the hash value deriving section 102, and the i-node number obtaining section 104 may be implemented by the above-described readout API.

During the execution of the game, the receiving section 100 receives a readout request including the full path information of a file from the game. The hash value deriving section 102 derives the hash value of the received full path information by a predetermined hash function. The i-node number obtaining section 104 refers to the flat path table 220 configured as a correspondence file, and obtains information for identifying the recording location of the file, or an i-node number in this case, using the hash value. The file access section 106 can thereby access the file specified by the game using the i-node number, and reads out the file.

It is to be noted that the above represents a file access operation in a case where the hash value derived by the hash value deriving section 102 is a non-colliding hash value. When the collision flag of the derived hash value is set to zero, the i-node number obtaining section 104 determines that the hash value does not collide, and is able to obtain the i-node number from the flat path table 220.

In a case where the hash value derived by the hash value deriving section 102 is a colliding hash value, the i-node number obtaining section 104 determines that the hash value collides because the collision flag of the derived hash value is set to one. Hence, the i-node number obtaining section 104 accesses the collision file 222 using the offset information associated with the hash value, and searches for the file name specified in the full path information within the collision file 222. When finding the file name in the collision file 222, the i-node number obtaining section 104 obtains the i-node number associated with the file name. Thus, when the hash value derived by the hash value deriving section 102 collides, the i-node number obtaining section 104 refers to the collision file 222, and obtains the i-node number from the file name. The file access section 106 can thereby access the file specified by the game using the i-node number, and reads out the file.

As described above, the file access section 106 accesses the file using the i-node number. In the information processing device 10 according to the present embodiment, the memory operating as a buffer (for example DDR3), the auxiliary storage device 2, and the ROM medium 44 are present as a storage section that stores the file. The ROM medium 44 is loaded into a media drive 32 so that data is read out from the ROM medium 44. Here, a comparison of the respective data readout speeds of the memory, the auxiliary storage device 2, and the media drive 32 with each other shows that the data readout speed is decreased in this order.

In this sense, in the present embodiment, the memory will be referred to as a high-speed device, the auxiliary storage device 2 will be referred to as a medium-speed device, and the media drive 32 will be referred to as a low-speed device. The following description will be made of a mechanism for increasing the speed of file access processing in which mechanism attention is directed to differences in the data readout speed.

Incidentally, before the description of the mechanism for increasing the speed is made, because the information processing device 10 has a function of copying the game software 70 recorded on the ROM medium 44 to the auxiliary storage device 2 during execution of the game software 70 recorded on the ROM medium 44, this copying function will be described first.

Figure 15:
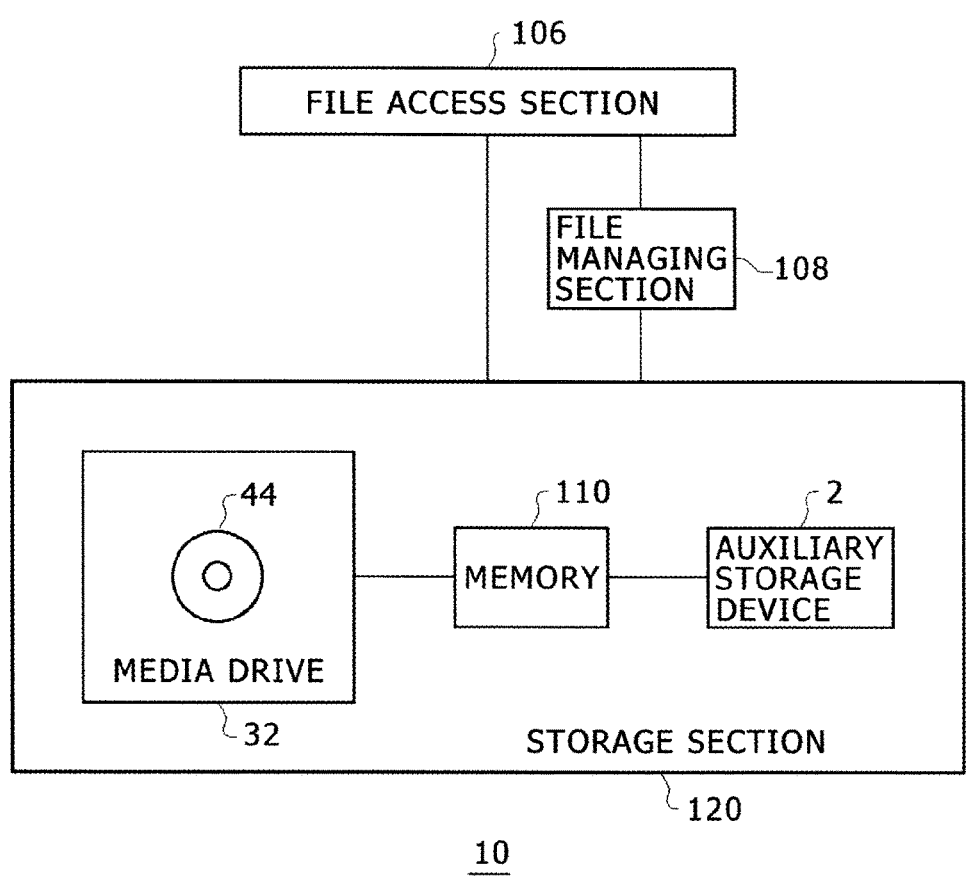
FIG. 15 is a diagram showing a configuration for implementing a file management function.

FIG. 15 shows a configuration for implementing a file management function. The information processing device 10 includes a file access section 106 for making file access and a file managing section 108 for performing file management. The file managing section 108 also has a function of copying the game software 70 from the ROM medium 44 to the auxiliary storage device 2. The information processing device 10 has, as the storage section 120 storing files, the memory 110 as a high-speed device, the auxiliary storage device 2 as a medium-speed device, and the media drive 32 as a low-speed device. The memory 110 is connected to the auxiliary storage device 2 or the media drive 32. The memory 110 has a function of temporarily storing data read out from the auxiliary storage device 2 or the media drive 32. Incidentally, for higher speed of file access, the metadata included in the metadata region 204 shown in FIG. 10 is expanded in the memory 110 in advance.

As described with reference to FIG. 14, the file access section 106 accesses a file specified in full path information by the game, using an i-node number, and reads out the data of the file. Specifically, the file access section 106 reads out file data from a recording region of the ROM medium 44, which recording region is identified by the i-node number, into the memory 110, obtains the file data from the memory 110, and provides the file data to the game program.

Figure 16:
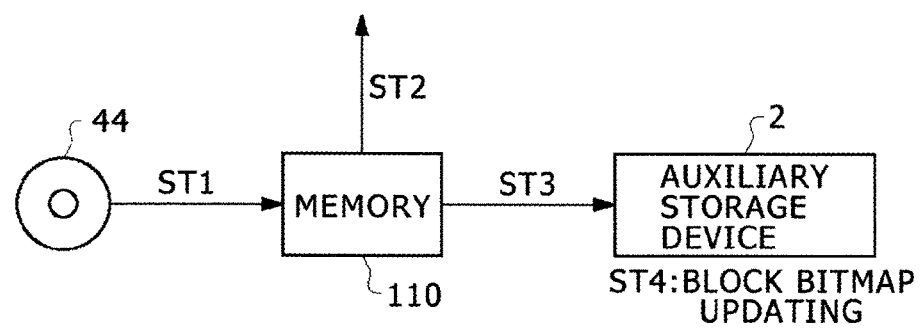
FIG. 16 is a diagram of assistance in explaining an example of copy processing.

FIG. 16 is a diagram of assistance in explaining an example of copy processing. This copy processing assumes that the game program is being executed. When the game program requests the readout of data, the file access section 106 reads out the data recorded on the ROM medium 44 from the media drive 32, and the memory 110 temporarily stores the read-out data (ST1). The file access section 106 provides the data stored in the memory 110 to the game program (ST2). The game program can thereby make the game progress using the data requested to be read out.

At this time, the file managing section 108 reads out the data stored in the memory 110, and records the data in the auxiliary storage device 2 (ST3). The data can be copied from the low-speed device to the medium-speed device by thus not only providing the game program with the data read out into the memory 110 according to the request from the game program but also recording the data in the auxiliary storage device 2. The data copied to the auxiliary storage device 2 is read out from the auxiliary storage device 2 to the game when the game program needs the data next time.

The file managing section 108 manages the file copied from the ROM medium 44 to the auxiliary storage device 2. For example, the file managing section 108 may manage, as a bitmap for one file, information indicating whether or not the file is copied. Incidentally, in the present embodiment, a file is constituted of one or more blocks. It is therefore desirable that the file managing section 108 manage, in block units, information indicating whether or not the blocks are copied. When the file managing section 108 has copied a data block from the ROM medium 44 to the auxiliary storage device 2, the file managing section 108 sets information (flag) indicating that the corresponding data block is copied on a block bitmap, and thus updates the block bitmap (ST4). The file managing section 108 can thereby recognize which block is copied from the ROM medium 44 to the auxiliary storage device 2.

FIG. 17 schematically shows states of storage areas of the respective storage units of the storage section 120. A top row shows the states of storage areas of the memory 110 as a high-speed device. A middle row shows the states of storage areas of the auxiliary storage device 2 as a medium-speed device. A bottom row shows the states of storage areas of the ROM medium 44 as a low-speed device. In horizontally long rectangular regions schematically showing the respective storage areas, the areas divided by vertical lines represent blocks, and hatched blocks represent that data is already stored in the storage areas.

The memory 110 shown in the top row in this case stores the metadata in the metadata region 204, and further temporarily stores a part of the game data in the remaining storage areas. Because the storage areas of the memory 110 are of a small size, the region for temporarily storing the game data can be expanded by minimizing the size of the metadata included in the metadata region 204. Incidentally, the storage areas of the memory 110 are shown as if used fully in this case. In actuality, however, the storage areas of the memory 110 represent storage areas of a predetermined size in the memory 110, and thus the memory 110 is not used fully.

The block bitmap (block BMP) represents bitmap information managed by the file managing section 108. The file managing section 108 creates the block BMP by setting a flag value 1 for a block copied from the ROM medium 44 to the auxiliary storage device 2 and setting a flag value 0 for a block not copied from the ROM medium 44 to the auxiliary storage device 2. As described above, each time a block is copied from the ROM medium 44 to the auxiliary storage device 2, the file managing section 108 updates the block BMP. The file managing section 108 thereby grasps the latest storage state of the auxiliary storage device 2. An HDD (hard disk drive) as an example of the auxiliary storage device 2 shown in the middle row has recorded thereon block data copied from the ROM medium 44 by copy processing. Block areas that are not hatched indicate that block data is not yet copied in the block areas.

A BD (Blu-ray Disk) as an example of the ROM medium 44 shown in the bottom row has recorded thereon all of the data (package file 214) of the game software. Thus, all of the storage areas of the BD are hatched. Incidentally, because the package file 214 is encrypted or compressed in actuality, blocks different from those of the game data in the game data region 202 of the image file 210 correspond to the game data included in the package file 214. In FIG. 17, blocks after decoding and/or decompression are represented virtually, and blocks superposed in a vertical direction in respective storage areas represent a same block.

Returning to FIG. 15, the file access section 106 determines a storage medium to be accessed on the basis of the storage conditions of the storage section 120 managed by the file managing section 108. The game data storage conditions of the memory 110, the auxiliary storage device 2, and the ROM medium 44 in the storage section 120 will be described again.

(1) Storage Conditions in Memory 110

All of the metadata in the metadata region 204 is stored in the memory 110. Thus, the file access section 106 does not need to seek and search for the metadata recorded on the recording medium. The file access section 106 can refer to the metadata expanded in the memory 110, and quickly identify the i-node number of a file requested to be read out by the game. In addition, the memory 110 also stores a part of the game data temporarily. The game data is updated at any time as required. The file managing section 108 manages storage conditions in the memory 110, and grasps which block data is stored in the memory 110.

(2) Storage Conditions in Auxiliary Storage Device 2

The data once read out from the ROM medium 44 to the memory 110 is copied to and stored in the auxiliary storage device 2. Incidentally, description has been made of copying data read out into the memory 110 in response to a readout request from the game in the above-described copy processing. However, for example, even when there is no readout request from the game, the file managing section 108 may copy game data from the ROM medium 44 to the auxiliary storage device 2 in the background. In this case, the auxiliary storage device 2 stores not only game data requested to be read out but also other game data. Such copy processing records, in the auxiliary storage device 2, all or a part of the game software recorded on the ROM medium 44. The file managing section 108 manages storage conditions in the auxiliary storage device 2 by the block bitmap, and grasps which block data is stored in the auxiliary storage device 2.

(3) Storage Conditions on ROM Medium 44

All of the metadata and the game files are stored on the ROM medium 44.

Assuming that the above copy processing is performed, the file access section 106 provides the game with game data from one of the ROM medium 44, the auxiliary storage device 2, and the memory 110 in response to a readout request from the game according to a predetermined order of priority. As already described, the file managing section 108 manages the game data storage conditions of the memory 110 and the auxiliary storage device 2. Specifically, the file managing section 108 manages the storage conditions in file units or block units. As for the storage conditions of the auxiliary storage device 2, in particular, the file managing section 108 manages the storage conditions of the auxiliary storage device 2 using the block bitmap on which information indicating whether or not each block or file is already copied is set.

The predetermined order of priority is set such that a device having a fast data readout speed is selected preferentially. Specifically, when game data requested to be read out is stored in the memory 110, the file access section 106 provides the game with the game data from the memory 110. At this time, the file managing section 108 does not need to refer to the block bitmap indicating the storage conditions of the auxiliary storage device 2.

When the game data requested to be read out is not stored in the memory 110, the file managing section 108 refers to the block bitmap to determine whether the game data is stored in the auxiliary storage device 2. When the game data is stored in the auxiliary storage device 2, the file access section 106 reads out the game data from the auxiliary storage device 2 to the memory 110, and provides the game with the game data. Thus, when the game data requested to be read out is not stored in the memory 110 but stored in the auxiliary storage device 2, the file access section 106 provides the game with the game data from the auxiliary storage device 2.

When the file managing section 108 determines that the game data requested to be read out is not stored in the memory 110 nor in the auxiliary storage device 2, the file access section 106 reads out the game data from the ROM medium 44 loaded in the media drive 32 to the memory 110, and provides the game with the game data. Incidentally, at this time, the file managing section 108 copies the game data read out from the ROM medium 44 to the memory 110 to the auxiliary storage device 2, and updates the block bitmap. Therefore, when the same game data is provided to the game next time, the game data can be provided from the auxiliary storage device 2 rather than from the ROM medium 44. Incidentally, at this time, when the game data is stored in the memory 110, the game data is provided from the memory 110 to the game.

Thus, the order of priority of the storage units in the storage section 120 is determined according to order of speed, and game data stored in a storage section having a high priority is provided to the game, whereby higher-speed file access can be achieved.

The above description has been made of file access in a case where game data on the ROM medium 44 is copied to the auxiliary storage device 2. Description will next be made of file access in a case where game software is downloaded from the content server 12 or the store server 16.

In game software download processing, the auxiliary storage device 2 is used as a storage device for storing a plurality of files constituting the game software. As described above with reference to FIGS. 3 to 6, in the game software, each file belongs to at least one group, and at least one file belongs to each group.

Download processing is performed in group units. For example, in a case where files X, Y, and Z belong to a group S, when a request to download the group S is generated, the files X, Y, and Z are downloaded from the content server 12, and all of the files X, Y, and Z belonging to the group S are recorded in the auxiliary storage device 2. Incidentally, when the file X is already downloaded, the files Y and Z are downloaded from the content server 12. All of the files X, Y, and Z belonging to the group S are thereby recorded in the auxiliary storage device 2.

As shown in FIG. 3, the groups of the game software can be identified by group numbers. The group numbers are set in descending order from one. A download processing section (not shown) may determine the order of groups to be downloaded in the same manner as the order of the group numbers, as a group determining method. That is, the download processing section determines a group of a lower number as an object to be downloaded earlier, and therefore determines that the first group 72a, the second group 72b, the third group 72c, . . . are to be downloaded in this order, that is, in the order of the group numbers. The download processing section downloads the files included in the groups according to the order.

The download processing section transmits download requests to the content server 12 in group units, and records game data transmitted from the content server 12 in the auxiliary storage device 2. At this time, the file managing section 108 manages the storage conditions of files or blocks in group units. The downloaded files are the compressed and encrypted package file 214. Thus, the file managing section 108 generates a first bitmap indicating the storage conditions of the game data in the package file 214 and a second bitmap indicating the storage conditions of the game data when the package file 214 is decoded and decompressed. Incidentally, the second bitmap is the same as the bitmap described in relation to the copying of the game data from the ROM medium 44 to the auxiliary storage device 2. As described above in relation to the copying of the game data, the file managing section 108 manages the second bitmap, whereby the file access section 106 can make efficient file access. Incidentally, when the file access section 106 manages the first bitmap, file management can be performed properly in a case where a file not to be mounted is downloaded, for example.

The present disclosure has been described above on the basis of embodiments thereof. The embodiments are illustrative, and it is to be understood by those skilled in the art that combinations of constituent elements and processing processes of the embodiments are susceptible of various modifications and that such modifications also fall within the scope of the present disclosure. In the embodiments, a game is shown as an example of an application. However, the present technology may be applied to other applications.

The present technology contains subject matter related to that disclosed in Japanese Priority Patent Applications JP 2013-228809 and JP 2013-228810 both filed in the Japan Patent Office on Nov. 1, 2013, the entire contents of which are hereby incorporated by reference.

What is claimed is:

1. An information processing device for accessing a file included in game data, the game data having a correspondence file associating a hash value of full path information of the file with information for identifying a recording location of the file, the information processing device comprising:
   a computer having a processor operating to execute at least one computer program, such that the information processing device implements:
   a receiving section receiving a readout request including the full path information of the file from a game;
   a deriving section deriving the hash value of the full path information;
   an obtaining section referring to the correspondence file, and obtaining the information for identifying the recording location of the file using the hash value; and
   a file access section accessing the file on a basis of the obtained information,
   wherein the game data is created by: authoring an image file of plain text data lacking compression, encryption and hash values, the image file being formed as one file having a data structure obtained by adding a metadata region; compressing the image file; writing to the metadata region a compression table indicating relation between file blocks before and after compression; and adding encryption and hash values to secure the game data.

2. The information processing device according to claim 1,
wherein the game data further includes a collision file associating file names with information for identifying recording locations of files, for full paths whose hash values collide with each other, and
when the hash value derived by the deriving section collides, the obtaining section refers to the collision file, and obtains the information for identifying the recording location of the file using a file name.

3. A non-transitory, computer readable storage medium containing game data including a program file for execution a computer, the game data including a plurality of files that are each assigned one or a plurality of blocks and including metadata of each file, the game data comprising:
a correspondence file associating hash values of full path information of the files with information for identifying recording locations of the files; and
a collision file associating file names with information for identifying recording locations of files, for full path information whose hash values collide with each other,
wherein the game data is created by: authoring an image file of plain text data lacking compression, encryption and hash values, the image file being formed as one file having the data structure obtained by adding a region including the metadata; compressing the image file; writing to the metadata region a compression table indicating relation between file blocks before and after compression; and adding encryption and hash values to secure the game data.

4. The data structure of game data according to claim 3, wherein the correspondence file includes information indicating whether or not the hash values collide.

5. A non-transitory, computer readable recording medium on which a program for a computer is recorded, the program, when executed by a computer, causes the computer to carry out actions, comprising:
receiving a readout request including full path information of a file, from a game, included in game data;
deriving a hash value of the full path information;
referring to a correspondence file associating the hash value of the full path information of the file with information for identifying a recording location of the file, and obtaining the information for identifying the recording location of the file using the hash value; and
accessing the file on a basis of the obtained information,
wherein the game data is created by: authoring an image file of plain text data lacking compression, encryption and hash values, the image file being formed as one file having a data structure obtained by adding a metadata region; compressing the image file; writing to the metadata region a compression table indicating relation between file blocks before and after compression; and adding encryption and hash values to secure the game data.

* * * * *